Nov. 19, 1940. W. E. KUHN Re. 21,625
TREATMENT OF HYDROCARBONS
Original Filed June 15, 1937
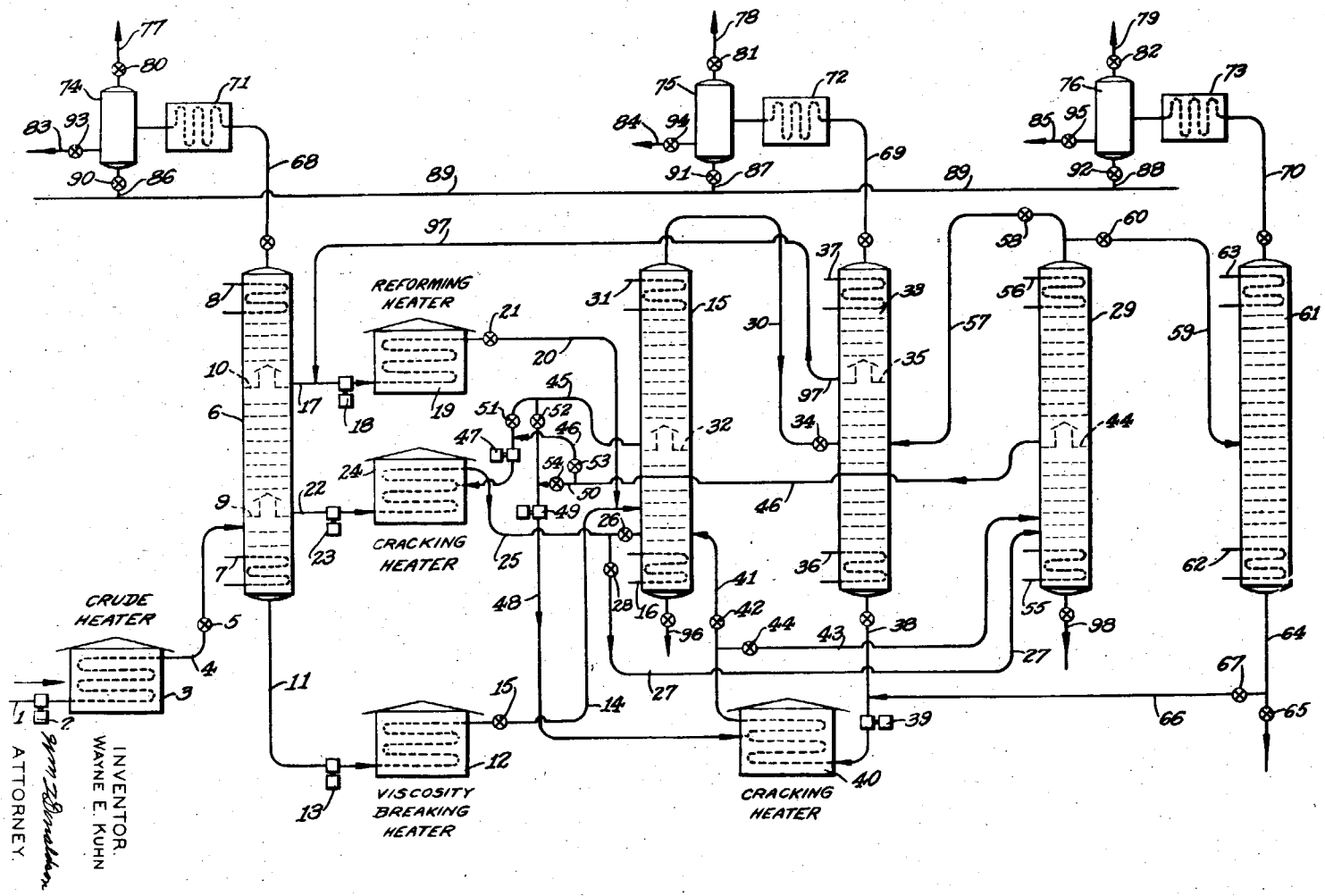
INVENTOR.
WAYNE E. KUHN
Wm. Z. Donaldson
ATTORNEY.

Reissued Nov. 19, 1940 Re. 21,625

UNITED STATES PATENT OFFICE 21,625

TREATMENT OF HYDROCARBONS

Wayne E. Kuhn, Jackson Heights, N. Y., assignor to The Texas Company, New York, N. Y., a corporation of Delaware Original No. 2,178,838, dated November 7, 1939, Serial No. 248,770, December 31, 1938, which is a division of Serial No. 148,265, June 15, 1937. Application for reissue October 1, 1940, Serial No. 359,293

4 Claims. (Cl. 196—49)

This application is a division of my pending application, Serial No. 148,265, filed June 15, 1937.

This invention relates to the treatment of hydrocarbon oil for the production of lower-boiling oils from higher-boiling oils, and particularly for the production of lower-boiling oils including gasoline constituents. More particularly, the invention relates to the treatment of crude oil or partially topped crude oil to produce therefrom gasoline of high anti-knock value.

It is an object of the invention to provide a method of treating simultaneously a plurality of hydrocarbon oils of varying boiling ranges, and intermediate products produced therefrom, under separate optimum conditions selected for each oil to produce therefrom motor-fuel products, and intermediate products suitable for further conversion, under conditions selected for each treatment to effect a combined operation of maximum efficiency whereby motor fuel of high anti-knock value is produced with minimum production of gas and undesirably heavy products and minimum deposition of coke.

It is a further object of the invention to provide a method whereby crude oil or partially topped crude oil may be efficiently treated under the above-described conditions by separating said oil into various fractions and treating the fractions so produced, and intermediate products produced therefrom, under the above-described separate conditions of maximum over-all efficiency.

It is a further object of the invention to provide an improved cycle of operation wherein the separate treatments of the crude oil and intermediate products thereof are correlated to effect maximum conversion thereof to gasoline of high anti-knock value under conditions of highest efficiency with the formation of a minimum amount of coke.

According to the present invention a plurality of hydrocarbon oil fractions of differing boiling ranges is treated in combination whereby a light fraction which may be a heavy naphtha, an intermediate fraction which may be a virgin gas oil, a second intermediate fraction which may be a light clean hydrocarbon oil produced as condensate from cracked products produced in the system, and a heavy fraction which may be a heavy gas oil or reduced crude are separately subjected to elevated conditions of temperature and pressure to effect reforming of the heavy naphtha to produce constituents of improved anti-knock value, substantial cracking and conversion of the intermediate fractions under conditions of maximum efficiency for each to products in the gasoline boiling range, and mild cracking and conversion of the heavy fraction to lighter products including a substantial proportion of constituents above the gasoline boiling range. A heavy gas-oil condensate produced in the system is combined with one or both of the intermediate fractions after said fraction or fractions have been subjected to cracking conditions, and the thus merged products are subjected to cracking conditions of temperature and pressure to effect cracking of the heavy condensate to lighter products with the desired degree of additional cracking of the intermediate fraction with which the heavy condensate is merged.

The combined treatment of heavy condensate and an intermediate fraction suitably may be carried out in a single elongated heating zone of restricted cross section such as a pipe coil whereby the heavy condensate is introduced into the coil at an intermediate point or points selected so that the intermediate fraction is first subjected to cracking conditions of temperature and pressure to effect substantial conversion thereof prior to the admixture therewith of the heavy condensate. The merged products are thereafter passed through the remainder of the coil under conditions selected to produce the desired cracking of the heavy condensate with the further cracking of the intermediate fraction to the desired extent.

The first-mentioned intermediate fraction which preferably is a clean gas oil, for example, a virgin gas oil, is subjected to single-pass cracking and conversion under relatively high-temperature and high-pressure conditions whereby a high percentage conversion to products in the gasoline boiling range is rapidly effected.

The heavy fraction, which may be a reduced crude, is subjected to a relatively mild cracking treatment to effect conversion thereof into lighter products, the conditions of this cracking operation being controlled to avoid excessive coke deposition.

The cracked products resulting from the treatment of the heavy naphtha, the intermediate fractions, the heavy condensate merged with one or both intermediate fractions, and the said heavy fraction may be separated and fractionated individually or in any desired combination to separate therefrom a heavy condensate which is subjected to further cracking treatment in combination with one or both of said intermediate fractions, as described above, and a clean condensate lower boiling than said heavy condensate, which serves as the second-mentioned intermediate fraction.

The said light condensate or second-mentioned intermediate fraction is subjected to a separate low-pressure high-temperature cracking operation to effect a relatively low crack per pass on a high over-all efficiency basis. This cracking operation may be carried out on a recycling basis wherein condensates separated from cracked products in the system are cracked to completion.

Specifically, the present invention contemplates the distillation of a crude oil or partially topped crude oil to separate therefrom a light fraction which may be a heavy naphtha, a heavy fraction which may be a reduced crude or a heavy gas oil and an intermediate fraction having a boiling range intermediate that of the said heavy and light fractions and the treatment in combination of the fractions thus obtained in the manner described above. Preferably, the heavy naphtha, the heavy fraction, the intermediate fraction which is a virgin gas oil, and a second intermediate gas-oil fraction are separately heated under cracking conditions of temperature and pressure in separate elongated heating zones of restricted cross section to effect conversion of each to lighter products under specific conditions of maximum conversion to high anti-knock constituents whereby over-all conversion to motor fuel of high anti-knock value under conditions of maximum efficiency is effected. A heavy condensate fractionated from cracked products from the system, as described above, is introduced into the separate elongated heating zone in which the virgin gas oil has been subjected to substantial cracking and the merged products are passed through the remainder of the said heating zone to effect conversion of the heavy condensate.

Preferably, the reformed products from the reforming treatment of the heavy naphtha fraction are admixed with the products of the relatively mild cracking treatment of the heavy fraction to assist vaporization of the latter to vapors from which a heavy gas-oil condensate may be recovered and to leave a liquid residue of relatively high viscosity. Preferably, the cracked products resulting from the cracking of the virgin gas oil and the heavy condensate merged therewith, and the mixture of products from the reforming treatment of the heavy naphtha and the cracking of the heavy fraction are combined and separated, and the vapors therefrom are fractionated to separate therefrom a heavy gas-oil condensate, a lower-boiling gas-oil condensate, and a naphtha distillate which may be further fractionated into a heavy naphtha condensate for reforming and a light naphtha distillate. The last-mentioned gas-oil condensate together with any cycle gas oil from the cracking treatment of the second-mentioned intermediate fraction constitute said second-mentioned intermediate fraction, the products of cracking of which are preferably separately treated to recover therefrom reflux condensate, which may be obtained as a heavy gas-oil fraction and a lower-boiling gas-oil fraction, and a naphtha distillate.

The accompanying drawing is a diagrammatic view in elevation of apparatus suitable for carrying out the present invention. The invention will be described in detail with reference to the drawing, but it is to be understood that the invention is capable of various modifications which may be beyond the physical limitations of the apparatus illustrated, and the invention, therefore, is not to be limited by reference to the said drawing.

Referring to the drawing, a heavy oil which may be crude oil or partially topped crude oil is introduced into the system through line 1 by means of pump 2. The heavy oil so introduced is first subjected to a preliminary distilling operation wherein the heavy oil is heated and then flashed into a fractionating zone to effect separation of vapors and liquid residue and fractionation of the vapors. The preliminary heating of the heavy oil may be accomplished partially or entirely by suitable heat exchange in the system or partially or entirely by means of a separate source of heat.

For purposes of illustration the latter method is employed in the modification shown in the drawing, and the heavy oil introduced through line 1 is passed through a heating coil located in a crude heater 3. Crude heater 3 may be a coil located in a relatively cool portion of a furnace, but to simplify presentation of the subject matter it is illustrated as a separate unit. From crude heater 3 the heated heavy oil is withdrawn, through line 4, at a temperature of 500° F. to 750° F. with or without reduction in pressure afforded by valve 5 located in line 4 and introduced from line 4 into a crude fractionator or flash tower 6 which may be operated from atmospheric to 100 pounds per square inch pressure. The heating of the heavy oil is controlled to effect distillation in the bottom of tower 6 of substantially all constituents boiling below approximately 650° to 750° F. To this end auxiliary heating means 7 may be provided in the bottom of tower 6. The vapors separated by the distillation of the heavy oil ascend tower 6 and are fractionated to effect the separation of desired condensates, for example, a virgin gas-oil condensate and, if desired, a heavy naphtha condensate. Cooling means 8 are provided in the upper portion of tower 6 to assist the desired fractionation of the vapors by maintaining a top temperature of 250° F. to 350° F. A cooling coil is illustrated by cooling means 8, but cooling may also be effected wholly or partially by the introduction of suitable reflux material. Suitable bubble towers and trays and other gas-and-liquid contact means may be provided in tower 6 to effect the various operations which constitute fractionation, and trap-out trays 9 and 10 may be provided to collect, respectively, a virgin gas-oil condensate and a heavy naphtha condensate.

The above-described separation of the crude oil into reduced crude and gas oil and heavy naphtha condensates is for the purpose of illustration only. Reduced crude so separated may be used as such in the process of the invention, or the crude oil may be further distilled to separate therefrom vapors from which a heavy gas-oil condensate may be separated, for example, one having an initial boiling point of 650° F. to 750° F. This may be accomplished in a single vaporization stage or in a plurality of stages. For example, the reduced crude collected in the bottom of tower 6 may be further distilled, by separate means not shown, to effect the production of a heavy gas-oil distillate which may be used in the various modifications of the process of the invention described below in place of the reduced crude referred to therein.

The virgin gas-oil condensate collected in trap-out tray 9 preferably is a clean gas oil having an end point of approximately 650° F. to 700° F. with an initial boiling point of 400° F. to 500°

F. The heavy naphtha condensate collected in trap-out tray 10 preferably is one having an end point of 400° F. to 500° F. with an initial boiling point of 200° F. to 300° F.

The reduced crude remaining after the distillation of the heavy oil in tower 6 collects in the bottom thereof and is withdrawn therefrom through line 11. The reduced crude, which, by the above-preferred operation of the tower 6, has an initial boiling point of 650° F. to 700° F. is next subjected to a viscosity-breaking operation to effect a relatively mild cracking to lighter products with the production of a relatively large proportion of constituents above the gasoline boiling range. The viscosity-breaking operation is preferably carried out in a separate coil which may be located in the cooler part of a furnace. However, for purposes of simplification in the apparatus illustrated, there is provided a separate viscosity-breaker heater 12. The reduced crude withdrawn from tower 6 through line 11 is introduced to heater 12 by means of pump 13 located in line 11. The heater may be operated at a pressure of 150 to 500 pounds per square inch at a temperature of approximately 750° to 900° F., for example, 850° F. with the time of heating limited to effect 20% to 30% conversion with the production of 8% to 15% gasoline.

The viscosity-broken products are withdrawn from heater 12 through line 14 with or without a reduction in pressure which may be afforded by valve 15 located in line 14. Line 14 connects with the lower portion of an evaporating and fractionating tower 15. In tower 15 the viscosity-broken products are separated into vapors and unvaporized liquid, and to assist the desired vaporization auxiliary heating means 16 may be provided in the lower portion of tower 15. For example, vaporization is effected to such an extent that the residue has a viscosity of, for example, 3000 seconds at 122° F. (Saybolt-Furol). To assist the vaporization of the viscosity-broken products there may be admixed therewith prior to the introduction of the viscosity-broken products into tower 15 hot products from a naphtha reforming treatment, as described below.

Heavy naphtha condensate, collected in trap-out tray 10 may be withdrawn therefrom by line 17 provided with a pump 18 and introduced into reforming heater 19 wherein the heavy naphtha condensate is heated under relatively drastic conversion conditions to effect reforming of the product to improve the anti-knock value thereof. Thus, in heater 19 the heavy naphtha may be heated to a temperature of 900° F. to 1100° F. at a pressure of 200 to 1000 pounds per square inch, for example, 975° F. at 700 pounds per square inch. The cracked reformed products may be withdrawn from furnace 19 through line 20 any reduction in pressure desired being accomplished by means of valve 21 provided in line 20. Line 20 connects with line 14 whereby the reformed products are admixed with the viscosity-broken products prior to introduction into tower 15 in order to effect intimate mixture of the two streams whereby vaporization of the relatively heavy constituents of the viscosity-broken products may be assisted in tower 15.

The virgin gas-oil fraction collected in trap-out tray 9 may be withdrawn therefrom through line 22 provided with a pump 23 and introduced into cracking heater 24 wherein it is heated under relatively drastic cracking conditions to effect a high rate of conversion to gasoline constituents. To effect 35% to 55% cracking with the production of 30% or more of 420° F. end point gasoline the gas oil may be heated in heater 24 to a temperature of 850° F. to 1100° F. at a pressure of 500 to 2000 pounds per square inch or higher, for example, 950° F. at 700 pounds per square inch.

The cracked products may be withdrawn from cracking heater 24 through line 25 and introduced thereby into the lower portion of tower 15 with any desired reduction in pressure being afforded by valve 26 located in line 25; or all or a portion of the cracked products from cracking heater 24 may be diverted from line 25 through line 27, provided with a valve 28 and introduced thereby into the lower portion of a separate evaporating and fractionating zone in tower 29 to effect separation of vapors from liquid residue and fractionation of the vapors.

Conditions of temperature and pressure are maintained in tower 15 whereby vapors containing gas oil and lighter constituents pass overhead through line 30. For example, tower 15 may be maintained at a pressure of 25 to 250 pounds per square inch with a top temperature of 650° F. to 800° F. and a bottom temperature of 700° F. to 850° F. Any desired means, such as reflux, may be utilized to provide the temperature control in the upper portion of the tower 15, but for purposes of illustration a cooling coil 31 is indicated. The liquid residue collects in the bottom of tower 15 and may be withdrawn through line 96 for use elsewhere, for example, as fuel oil.

The vapors withdrawn from tower 15 through line 30 are introduced into a fractionating zone in tower 33, any desired reduction in pressure being effected by means of valve 34 located in line 30. In tower 33 conditions of temperature and pressure are maintained to effect separation from the vapors of a condensate consisting of gas oil which collects in the bottom of tower 33. For example, at a pressure of 25 to 250 pounds per square inch tower 33 may be operated with a bottom temperature of 500° F. to 750° F. and a top temperature of 250° F. to 400° F. A trap-out tray 35 may be provided at an intermediate point in tower 33 to collect a heavy naphtha reflux condensate. This may be combined with the heavy naphtha condensate from tower 6 for reforming treatment, for example, by means of line 97 which connects with line 17. Heating means 36 and cooling means 37 may be provided to effect desired control of the temperature conditions in tower 33 whereby the desired light gas-oil fraction is collected in the bottom of the tower and a naphtha fraction passes overhead as vapor.

The gas-oil fraction collected in the bottom of tower 33 may be withdrawn therefrom through line 38 provided with a pump 39 and introduced into a cracking heater 40 wherein the gas oil is heated, preferably under somewhat milder cracking conditions than in heater 24 whereby a lower crack per pass is obtained combined with maximum over-all conversion to gasoline constituents and minimum production of gas while maintaining the gasoline product at a high anti-knock value. This gas oil may be heated to a temperature of 875° F. to 1100° F. at a pressure of 50 to 400 pounds per square inch to effect a crack-per pass to gasoline of 10% to 25%.

The cracked products from heater 40 may be withdrawn therefrom through line 41 and introduced into the lower portion of tower 15, with or without reduction in pressure by means of valve 42 located in line 41. In tower 15 the cracked products introduced through line 41 are subjected to separation and fractionation simultaneously with the cracked products introduced through line 14 and through line 25.

Alternatively, all or a part of the cracked products from heater 40 may be diverted from line 41 through line 43, provided with a valve 44, and introduced into tower 29 to effect therein separation of vapors and liquid residue.

A trap-out tray 32 may be provided in tower 15 to effect collection of a heavy gas-oil reflux condensate, for example, one having an initial boiling point of approximately 600° F. to 650° F. Similarly, in tower 29 a trap-out tray 44 may be provided at an intermediate point therein to effect collection of a heavy gas-oil reflux condensate. The heavy gas oil collected in trap-out trays 32 and 44 may be withdrawn therefrom through lines 45 and 46, respectively. Line 45 connects with at least one intermediate point in the heating coil of cracking heater 24 whereby the heavy gas oil may be introduced into the coil of heater 24 by means of pump 47 located in line 45 whereby the heavy gas oil is raised to its cracking temperature and subjected to cracking conditions during the latter stages of the cracking of the virgin gas oil undergoing treatment in heater 24. The connection or connections are arranged whereby a substantial portion of the coil of heater 24 lies between the connection and the inlet whereby the virgin gas oil introduced through line 22 is subjected to the desired elevated conditions of temperature and pressure to effect substantial cracking thereof prior to admixture with heavy gas oil introduced through line 45. For example, the heavy gas oil may be injected into the coil containing the virgin gas oil undergoing cracking at a point whereby the resulting mixture thereafter passes through the portion of the coil constituting the soaking section. In this manner the temperature of the virgin gas oil may be moderated during the soaking period to prevent excessive formation of gas, and the heavy gas oil may be held at its most efficient cracking temperature to effect maximum conversion to lighter products, for example, lighter gas oil and gasoline constituents. For example, at a pressure of 700 pounds per square inch the mixture may be maintained at a temperature of 800° F. to 950° F.

Line 46 connects with line 45 whereby all or a portion of any heavy gas oil collected in trap-out tray 44 may be combined with the heavy gas oil in line 45 for passage therewith into the coil of heater 24. If desired, all or a portion of the heavy gas oil from trap-out tray 32 may be diverted from line 45 through line 48 provided with a pump 49 for introduction into the coil of cracking heater 40 in the same manner as described in connection with the introduction thereof into the coil of cracking heater 24. If desired, all or a portion of the heavy gas oil passing through line 46 may be diverted through line 50 into line 48 for admixture with the heavy gas oil passing therethrough to be introduced into the coil of cracking heater 40. Valves 51, 52, 53 and 54 may be provided in lines 45, 48, 46 and 50, respectively, whereby any desired distribution of the heavy gas oil may be effected between the heaters 24 and 40. Suitable heating or heat exchange means may be provided in connection with line 45 and/or line 48 for preheating the heavy gas oil therein to any desired temperature prior to introduction into the coils of heater 24 and/or heater 40. For example, means not shown may be provided for preheating the heavy gas oil by indirect heat exchange with hot products from heaters 24 and 40 passing through lines 25 and 41, respectively.

Conditions of temperature and pressure in tower 29 are regulated to effect substantially complete vaporization of the cracked products introduced therein whereby, as described above, a heavy gas-oil reflux condensate is collected in trap-out tray 44 and whereby the vapors passing overhead consist of lower-boiling gas oil and lighter constituents. For example, tower 29 may be maintained at a pressure of 25 to 250 pounds per square inch with a top temperature of 650° F. to 800° F. Heating means 55 may be provided in the bottom of tower 29 to assist in the vaporization desired, and cooling means 56 may be provided in the top of tower 29 to assist in the desired fractionation. The liquid residue collects in the bottom of tower 29 and may be withdrawn through line 98 for use elsewhere, for example, as fuel.

The vapors which ascend to the top of tower 29 may be withdrawn therefrom through line 57 and introduced thereby into tower 33 with or without any reduction in pressure effected by valve 58 in line 57. In tower 33 the vapors introduced through line 57 are fractionated together with vapors introduced through line 30 to produce therefrom a gas-oil condensate and a light naphtha or gasoline distillate.

If desired, the vapors from tower 29 may be diverted entirely or partly from line 57 through line 59 provided with a valve 60 and introduced thereby into a fractionating zone maintained in tower 61 wherein conditions of temperature and pressure are maintained to effect separation of the vapors into a gas-oil condensate which collects in the bottom of the tower 61 and a gasoline distillate which passes overhead. For example, at a pressure of 25 to 250 pounds per square inch tower 61 may be maintained with a bottom temperature of 500° F. to 750° F. and a top temperature of 300° F. to 400° F. Heating means 62 and cooling means 63 may be provided in the bottom and top, respectively, of tower 61 to effect the desired separation.

The gas oil collected in the bottom of tower 61 may be withdrawn therefrom through line 64 provided with valve 65 for treatment elsewhere. If desired, all or a portion of the gas oil withdrawn through line 64 may be diverted through line 66 provided with valve 67 which connects with line 38 whereby gas-oil condensate separated in tower 61 is passed to cracking heater 40 for treatment therein in conjunction with gas-oil condensate separated in tower 33.

The vapors from towers 6, 33 and 61 are withdrawn therefrom through lines 68, 69 and 70, respectively.

Condensers 71, 72 and 73 are provided in lines 68, 69 and 70, respectively, to effect condensation of gasoline constituents in the vapors. The mixtures of condensed vapors and uncondensed gases from condensers 71, 72 and 73 are introduced into receivers 74, 75 and 76, respectively, wherein separation of gases and liquids is effected. Gases may be withdrawn from the receivers and from the system through lines 77, 78 and 79 provided with valves 80, 81 and 82, respectively. The gasoline fractions may be withdrawn separately from each of the collectors through lines 83, 84 and 85, or all or a portion of the gasoline from each of collectors 74, 75 and 76 may be withdrawn therefrom through lines 86, 87 and 88 which connect with line 89 for the collection of a desired blend of the gasolines. Valves 90, 91 and 92 are provided in lines 86, 87 and 88, respectively, to provide control of the fractions for blending purposes. Control of pressure on the system is provided by means of valves 80, 81 and 82 and valves 93, 94 and 95 in lines 83, 84 and 85, respectively.

Towers 15, 33, 29 and 61 are provided with trays and bubble caps or other gas and liquid contact means to assist in effecting the operations of evaporation, condensation, stripping, absorption, etc. which comprise the process of fractionation. It will be understood that the functions of these towers may be carried out by a lesser number of structures with suitable trap-out trays, etc. For example, towers 15 and 33 may be combined in a unitary structure with the provision of a trap-out tray to effect removal of the light gas-oil fraction, or towers 33 and 29 may be combined in a unitary structure in the same manner, or towers 29 and 61 could be so combined.

The flashing of the heated crude to effect separation of vapors and reduced crude is shown in the above example as being accomplished in one step. Alternatively, this operation could be carried out in two or more stages. Thus, for example, a limited flashing of the heated crude may be permitted in the first stage to effect separation of normally gaseous constituents and a selected fraction of the naphtha constituents. The partially reduced crude could then be further flashed in a second stage to remove remaining naphtha constituents and a gas oil as vapors. The flashing of the heated crude and the stripping therefrom of any desired constituents can be promoted by any suitable means in addition to those shown, for example, by the passage through the flash tower of hot gases or vapors from any suitable source.

Heaters 12, 19, 24 and 40 like heater 3 are shown as separate entities for purposes of illustration. It is to be understood, however, that the functions of these heaters may be performed by a like number of coils each located in a furnace structure which houses one or more other coils, the coils being arranged in various parts of the furnace in accordance with the temperatures desired to be imparted to the materials passing through the coils. For example, all of the coils may be housed in a single furnace structure.

The hot products passing from heaters 12, 19, 24 and 40 through lines 14, 20, 25 and 41, respectively, may be cooled, if desired, by suitable cooling means not shown, such as by the provision of heat exchange with cooler materials from other parts of the system or by the admixture therewith of suitable cooling liquids from any source within or without the system.

Heaters 12, 19, 24 and 40 are illustrated as provided with a coil only for application of cracking conditions to the hydrocarbons passing therethrough. However, a suitable insulated soaking chamber of enlarged cross-section may be provided in connection with any or all of said heaters in addition to the coil to assist in the cracking treatment.

According to a preferred method of operation of the process of the invention, as illustrated in the drawing, the heated crude is flashed in tower 6 under conditions to strip therefrom a gas oil and lighter constituents whereby all constituents boiling below approximately 650° F. to 750° F. are distilled. A clean virgin gas-oil fraction having an end point of approximately 650° F. to 750° F. with an initial boiling point of 450° F. to 550° F. is collected in trap-out tray 9, and a heavy naphtha condensate having an end point of 400° F. to 500° F. is collected in trap-out tray 10.

The virgin gas-oil fraction is passed through line 22 to heater 24 wherein it is heated, for example, to a temperature of 950° F. at 700 pounds per square inch pressure. A heavy gas-oil fraction having an initial boiling point of approximately 600° F. to 750° F. is collected in trap-out tray 32 in tower 15 and passed through line 45 for introduction into the coil of heater 24 into intimate contact with the virgin gas oil therein which has been heated to the cracking temperature. The heavy gas oil is preferably introduced into the coil of heater 24 whereby the resulting mixture of cracked or partially cracked virgin gas oil and heavy gas oil thereafter passes through a portion of the coil located in a relatively cool part of the furnace which serves as a soaking section for the virgin gas oil to effect the desired degree of cracking while serving to crack the heavy gas oil initially. Preferably these conditions are somewhat more drastic than those employed in the treatment of the reduced crude. For example, in this section the mixture of constituents may be heated to a temperature of approximately 875° F. If desired, a reduction in pressure may be effected in the coil immediately before, at or subsequent to the point of injection of the heavy gas oil. Cracked products from heater 24 are withdrawn therefrom through line 25 and introduced thereby into the tower 15, the pressure being reduced to that of tower 15 by means of valve 26 in line 25. If desired, the cracked products may be cooled prior to introduction into tower 15 by any suitable means, such as by the admixture therewith of a cooling liquid from any suitable source.

The reduced crude from tower 6 is withdrawn through line 11 and heated in heater 12 to effect a mild cracking of the reduced crude with the production of a substantial quantity of lighter products, including a substantial proportion of products heavier than gasoline, by being heated, for example, to a temperature of approximately 850° F. at a pressure of 200 pounds per square inch. The heated partially cracked reduced crude products are introduced into tower 15 through line 14 for separation and fractionation along with the cracked products from heater 24.

The heavy naphtha condensate collected in trap-out tray 10 in tower 6 is passed through line 17 to heater 19 wherein the heavy naphtha is heated under conditions of temperature and pressure to effect reforming of the heavy naphtha to improve its anti-knock value. For example, in heater 19 the heavy naphtha may be heated to a temperature of 950° F. at 700 pounds per square inch. The reformed products are withdrawn from heater 19 and passed to tower 15 for separation and fractionation therein and to assist in the desired evaporation of the heavy constituents contained in the cracked products from heaters 24 and 12. To this end the hot reformed products may be admixed with the partially cracked reduced crude in line 14, as shown, prior to introduction of the heavy cracked reduced crude into tower 15 to effect intimate mixture of the hot vapors of the reformed products and the heavy materials constituting the major proportion of the cracked reduced crude products prior to their introduction to tower 15 whereby the desired degree of evaporation of heavy products is effected. The pressure on the cracked reformed products is reduced prior to introduction into tower 15, for example, by means of valve 21 in line 20.

In tower 15 a heavy gas-oil fraction is collected in trap-out tray 32 and withdrawn therefrom through line 45 for introduction into the coil of heater 24, as described above. The relatively heavy liquid products remaining in the bottom of tower 15 after the desired evaporation is effected may be withdrawn therefrom through line 96 for use elsewhere, for example, as fuel.

The uncondensed vapors passing overhead from tower 15 through line 30 are further fractionated in tower 33 to effect the separation of a gas-oil fraction which is withdrawn therefrom through line 38 and passed to cracking heater 40 wherein it is heated to a temperature of, for example, approximately 925° F. at a pressure of approximately 200 pounds per square inch. The cracked products from heater 40 are withdrawn therefrom through line 41 and passed through line 43 for introduction into tower 29 for separation and fractionation. Conditions of temperature and pressure are maintained in tower 29 to effect the passage overhead of gas oil and lighter constituents. If desired, a heavy gas-oil fraction may be collected in trap-out tray 44 and combined with that passing through line 45 by means of line 46.

The vapors passing overhead from tower 29 are withdrawn through line 57 and may be introduced into tower 33 for fractionation therein together with the vapors introduced through line 30 to effect recovery of a gas-oil fraction, which is recycled to heater 40 together with gas oil recovered from the cracked products separated in tower 15 and condensed in tower 33. If desired, the vapors passing from tower 29 may be diverted through line 59 and introduced into a separate fractionating tower 61 wherein a gas-oil fraction is separated as condensate and withdrawn therefrom through line 64. This gas oil may be passed through line 66 to admixture with the gas oil in line 38 to effect its return to heater 40. The latter operation may be desirable in view of the fact that the heavy naphtha resulting from the viscosity-breaking operation is collected in trap-out tray 35 in tower 33 and passed through line 97 to admixture with the heavy naphtha from tower 6 in line 17 for passage to the reforming heater 19. By this method of operation the naphtha produced in the recycling cracking operation in heater 40, which has a high anti-knock value, is separately recovered in fractionator 61, and no portion of it is admixed with the naphtha to be reformed.

As an advantageous but less preferred method of operation of the present invention the heavy gas oil from trap-out trays 32 and 44 may be diverted through line 48 and introduced into the coil of heater 40, instead of into that of heater 24. In this method of operation the control of the heating of the mixture after the injection of the heavy gas oil is substantially the same as when heavy gas is introduced into admixture with the virgin gas oil being cracked in heater 24. That portion of the coil through which the mixture passes after admixture is preferably located in a cooler portion of the furnace and functions as a soaking section in the cracking of the light gas oil as well as a cracking section for the heavy gas oil. The mixture may be maintained in the said soaking section at a temperature of 900° F., and a reduction in pressure in the coil may be effected as described in connection with the operation of heater 24. The cracked products from heater 40 comprising the product of the cracking of both gas oils introduced therein are passed through lines 41 and 43 to tower 29 for separation and fractionation therein. Also in this method of operation it is advantageous to introduce the cracked products from heater 24, consisting in this case only of the products of cracking of the virgin gas oil, into tower 29, by diverting them through line 27 from line 25, to assist in the vaporization of the heavy constituents contained in the products of cracking of the heavy gas oil.

While the above methods of operation are preferred, the invention is not necessarily limited thereto. For example, the cracked products from heater 40 may be introduced through line 41 into tower 15 whereby simultaneously separation of all the cracked products from the system is effected in tower 15, or in this method of operation the cracked products from heater 24 may be introduced into tower 29 for separation and fractionation, or any suitable division of the cracked products from heaters 40 and 24 may be effected between the various evaporating zones.

The cracking of the heavy gas oil may be effected simultaneously in both heaters 24 and 40 by any desired division of the heavy gas oil collected in the system between the two heaters.

The operation of cracking heater 40 may be limited to the treatment of gas oil separated from the products of the viscosity-breaking operation and from the products of the cracking of the heavy gas oil by collecting the cracked products from heater 40 in fractionator 61 and removing a condensate therefrom for treatment other than in heater 40, for example, in a separate heater not shown, which may be operated under conditions to effect maximum over-all conversion at the greatest efficiency of the particular condensate so collected.

As a modification of the second preferred method described above the cracked products from heater 24, free from products of cracking of heavy gas oil, may be separately fractionated, for example, by introduction into a separate separation and fractionating means.

While the preferred modification of the invention involves cracking of the heavy gas oil by injection into heater 24 whereby it is advantageous to introduce the products of cracking from heater 24 into a common separator or evaporator with the cracked reduced crude from heater 12, the invention is not limited to this method of operation. Separate evaporating means may be provided for the products of cracking from each of heaters 24, 12 and 40 to effect separate recovery of the products of cracking and selective recycling or further separate cracking of those constituents of the cracked products of heaters 24, 12 and 40 most suitable for such treatment. The invention does not, however, contemplate any recycling of gas oil to cracking heater 24 other than in connection with the introduction of heavy gas oil through line 45, this heater being limited in that portion of the coil between the inlet and the point of introduction of the heavy oil to a once-through high rate of conversion treatment of a suitable clean gas oil to effect the production of a large proportion of high anti-knock gasoline therefrom.

In connection with the method of the present invention as described by reference to the drawing, it is to be understood that the various proportions of the fractions separated from the crude oil in tower 6 and intermediate fractions separated in towers 15, 29, 33 and 61 are each employed in the system in any desired proportion thereof. According to certain or all modifications of the invention it may be desirable to remove from the system for treatment elsewhere a desired portion of any of the various crude oil fractions and intermediate fractions leaving a remainder only for treatment in the system. To this end it is understood that suitable connections may be provided in the apparatus as illustrated in the drawing for withdrawing the said portions from the system without departing from the scope of the invention. For purposes of simplicity in illustrating the invention by means of the drawing these connections are omitted, but it is to be understood that the invention is not limited to such omission.

The invention thus permits the production from relatively heavy charging stock of marked coke-forming tendencies of a large portion of high anti-knock gasoline under conditions of highest efficiency. The preliminary distillation serves to produce a relatively clean cracking stock of minor coke-forming tendency suitable for a single-pass high rate of conversion in heater 24 wherein cracking is carried out under relatively high pressure and high temperature whereby production of gas and tar is minimized. The viscosity-breaking step permits the heavy residual stock which is undesirable from a coke-forming viewpoint for treatment under conditions of highest production of gasoline constituents to be converted for the most part into cracking stocks suitable for further conversion to gasoline constituents under more drastic conditions and a heavy gas oil stock suitable for further viscosity-breaking treatment under the same or more drastic conditions than in the original viscosity-breaking treatment. Due to its relatively clean character the heavy gas oil so produced may suitably be further cracked by intermediate introduction into the coils of a high-temperature cracking heater to effect the cracking of the heavy gas oil in the presence of the partially or substantially cracked lower-boiling gas oil.

The invention provides a process wherein the various steps may be modified in accordance with changes in the character of the crude or partially topped crude being treated to effect maximum efficient conversion to gasoline constituents of high anti-knock value by providing a flexibility of operation which is evident from the foregoing description. The invention has been described with reference to the apparatus illustrated in the drawing, but it will be readily understood that the invention is not to be limited by such description or by reference to the drawing but is capable of modifications which are beyond the limitations of the apparatus illustrated.

I claim:

1. The method of treating hydrocarbon oils to form therefrom low-boiling hydrocarbons suitable for motor fuel which comprises distilling crude oil to separate therefrom a reduced crude, a virgin gas oil condensate and a naphtha condensate, separately subjecting reduced crude thus obtained to relatively mild cracking conditions to effect conversion thereof to lighter products including a substantial proportion of constituents above the gasoline boiling range, separating the resultant cracked products into vapors and residue in a separating zone, separately subjecting virgin gas oil thus obtained to relatively more drastic cracking conditions to effect conversion into lighter products including gasoline constituents, separately subjecting naphtha thus obtained to cracking conditions of temperature and pressure adequate to effect reforming of said naphtha to improve the anti-knock value thereof, introducing the resultant hot reformed products into said separating zone to aid in the vaporization of the cracked reduced crude products, passing the separated vapors from said separating zone to a fractionating zone wherein the vapors are fractionated to form a heavy condensate and a lighter condensate, separately subjecting lighter condensate thus obtained to cracking conditions of temperature and pressure by passage as a stream through a heating zone of restricted cross-section to effect conversion into lighter products including gasoline constituents, introducing heavy condensate from said fractionating zone into an intermediate point of said last-mentioned heating zone to effect cracking of the heavy condensate, passing the resultant cracked products into a second separating zone wherein vapors separate from residue, passing the separated vapors to a second fractionating zone wherein the vapors are fractionated to form reflux condensate and lighter distillate and directing reflux condensate from the second fractionating zone to said heating zone of restricted cross-section to effect cracking of the reflux condensate.

2. The method of treating hydrocarbon oils to form therefrom low-boiling hydrocarbons suitable for motor fuel which comprises distilling crude oil to separate therefrom a reduced crude, a virgin gas oil condenate and a naphtha condensate, separately subjecting reduced crude thus obtained to relatively mild cracking conditions to effect conversion thereof to lighter products including a substantial proportion of constituents above the gasoline boiling range, separating the resultant cracked products into vapors and residue in a separating zone, separately subjecting virgin gas oil thus obtained to relatively more drastic cracking conditions to effect conversion into lighter products including gasoline constituents, separately subjecting naphtha thus obtained to cracking conditions of temperature and pressure adequate to effect reforming of said naphtha to improve the anti-knock value thereof, introducing the resultant hot reformed products into said separating zone to aid in the vaporization of the cracked reduced crude products, passing the separated vapors from said separating zone to a fractionating zone wherein the vapors are fractionated to form a heavy condensate and a lighter condensate, separately subjecting lighter condensate thus obtained to cracking conditions of temperature and pressure by passage as a stream through a heating zone of restricted cross-section to effect conversion into lighter products including gasoline constituents, introducing heavy condensate from said fractionating zone into an intermediate point of said last-mentioned heating zone to effect cracking of the heavy condensate, passing the resultant cracked products into a second separating zone wherein vapors separate from residue, passing the separated vapors to a second fractionating zone wherein the vapors are fractionated to form a heavy condensate, a lighter condensate and a desired distillate, combining lighter condensate from said second fractionating zone with said lighter condensate from said first-mentioned fractionating zone for passage to said heating zone of restricted cross-section and introducing heavy condensate from said second fractionating zone to an intermediate point in said heating zone of restricted cross-section.

3. The method of treating hydrocarbon oils to form therefrom low-boiling hydrocarbons suitable for motor fuel which comprises distilling crude oil to separate therefrom a reduced crude, a virgin gas oil condensate, a heavy naphtha condensate and a desired distillate, separately subjecting reduced crude thus obtained to relatively mild cracking conditions to effect conversion thereof to lighter products including a substantial proportion of constituents above the gasoline boiling range, separating the resultant cracked products into vapors and residue in a separating zone, separately subjecting virgin gas oil thus obtained to relatively more drastic cracking conditions to effect conversion into lighter products including gasoline constituents, separately subjecting heavy naphtha thus obtained to cracking conditions of temperature and pressure adequate to effect reforming of said naphtha to improve the anti-knock value thereof, introducing the resultant hot reformed products into said separating zone to aid in the vaporization of the cracked reduced crude products, passing the separated vapors from said separating zone to a fractionating zone wherein the vapors are fractionated to form a heavy condensate and a lighter condensate, separately subjecting lighter condensate thus obtained to cracking conditions of temperature and pressure by passage as a stream through a heating zone of restricted cross-section to effect conversion into lighter products including gasoline constituents, introducing heavy condensate from said fractionating zone into an intermediate point of said last-mentioned heating zone to effect cracking of the heavy condensate, passing the resultant cracked products into a second separating zone wherein vapors separate from residue, passing the separated vapors to a second fractionating zone wherein the vapors are fractionated to form a heavy condensate, a lighter condensate and a desired distillate, combining lighter condensate from said second fractionating zone with said lighter condensate from said first-mentioned fractionating zone for passage to said heating zone of restricted cross-section and introducing heavy condensate from said second fractionating zone to an intermediate point in said heating zone of restricted cross-section.

4. The method of treating hydrocarbon oils to form therefrom low-boiling hydrocarbons suitable for motor fuel which comprises fractionating crude oil to form a reduced crude and a virgin condensate, separately subjecting reduced crude thus obtained to relatively mild cracking conditions to effect conversion thereof to lighter products including a substantial proportion of constituents above the gasoline boiling range, separately subjecting the virgin condensate to relatively more drastic cracking conditions to effect conversion into lighter products including gasoline constituents, directing the resultant cracked products produced in cracking the reduced crude and virgin condensate to a separating zone wherein vapors separate from residue, passing the separated vapors from said separating zone to a fractionating zone wherein the vapors are fractionated to form a heavy condensate, a lighter condensate, and a desired distillate, separately subjecting lighter condensate thus obtained to cracking conditions of temperature and pressure by passage as a stream through a heating zone of restricted cross-section to effect conversion into lighter products including gasoline constituents, introducing heavy condensate from said fractionating zone into an intermediate point of said last-mentioned heating zone to effect cracking of the heavy condensate, passing the resultant cracked products into a second separating zone wherein vapors separate from residue, passing the separated vapors to a second fractionating zone wherein the vapors are fractionated to form a heavy condensate, a lighter condensate and a desired distillate, combining lighter condensate from said second fractionating zone with said lighter condensate from said first-mentioned fractionating zone for passage to said heating zone of restricted cross-section and introducing heavy condensate from said second fractionating zone to an intermediate point in said heating zone of restricted cross section.

WAYNE E. KUHN.